(12) United States Patent
Sim

(10) Patent No.: US 8,695,910 B2
(45) Date of Patent: Apr. 15, 2014

(54) FISHING REEL HAVING EXTERNALLY CONTROLLABLE BRAKE SYSTEM

(75) Inventor: Eun-Ki Sim, Incheon-si (KR)

(73) Assignee: Cocus, Inc., Gyeonggi-do (KR)

( * ) Notice: Subject to any disclaimer, the term of this patent is extended or adjusted under 35 U.S.C. 154(b) by 291 days.

(21) Appl. No.: 13/197,032

(22) Filed: Aug. 3, 2011

(65) Prior Publication Data

US 2012/0056029 A1  Mar. 8, 2012

(30) Foreign Application Priority Data

Sep. 2, 2010  (KR) .................... 20-2010-0009229 U

(51) Int. Cl.
*A01K 89/01*  (2006.01)

(52) U.S. Cl.
USPC ............ 242/289; 242/302; 242/303; 242/304

(58) Field of Classification Search
USPC .................. 242/245, 289, 290, 302, 303, 304
See application file for complete search history.

(56) References Cited

U.S. PATENT DOCUMENTS

| | | | | |
|---|---|---|---|---|
| 5,984,221 A * | 11/1999 | Kim | | 242/289 |
| 6,003,798 A * | 12/1999 | Kim | | 242/289 |
| 6,328,240 B1 * | 12/2001 | Sakaguchi et al. | | 242/289 |
| 6,398,141 B1 * | 6/2002 | Kim | | 242/289 |
| 7,374,120 B2 * | 5/2008 | Hyun | | 242/289 |
| 7,618,003 B2 * | 11/2009 | Rho | | 242/288 |
| 7,770,833 B2 * | 8/2010 | Noh et al. | | 242/289 |
| 2007/0295848 A1 * | 12/2007 | Hyun | | 242/289 |
| 2008/0257997 A1 * | 10/2008 | Rho | | 242/289 |
| 2010/0001112 A1 * | 1/2010 | Noh et al. | | 242/289 |

* cited by examiner

*Primary Examiner* — Emmanuel M Marcelo
(74) *Attorney, Agent, or Firm* — Levine Mandelbaum PLLC

(57) ABSTRACT

A fishing reel has an externally controllable brake system including a brake dial provided on a left side cover outside a spool cover. The brake system is provided between the brake dial and the spool cover so as to externally control a rotary force of a spool. The brake system includes a rotary section rotating together with a rotary motion of the brake dial, and a brake housing provided close to the rotary section so as to laterally slide in response of the rotation of the rotary section, wherein an inner ring is fixed to the brake housing on an inner surface of the spool cover so as to stop the rotary motion of the spool while being guided along the brake housing.

7 Claims, 7 Drawing Sheets

FISHING REEL HAVING EXTERNALLY CONTROLLABLE BRAKE SYSTEM

BACKGROUND OF THE INVENTION

1. Field of the Invention

The present invention relates, in general, to a fishing reel having an externally controllable brake system and, more particularly, to a fishing reel having an externally controllable brake system in which with adjustment of a brake dial, provided on a left side cover in such a manner as to be connected with the externally controllable brake system, the externally controllable brake system is actuated to simply control a rotary force of a spool, thereby improving the convenience of use and the performance of a product.

2. Description of the Related Art

Generally, a spool brake system of a fishing reel is commonly adapted to a bait casting reel in order to solve the problem of line backlashing (also referred to as 'line nesting) that is a phenomenon in which fishing line becomes entangled due to excessive rotation of a spool.

Since the spool brake system uses a spool which is oriented towards a lateral direction and rotates while the fishing line is being cast, the bait casting reel is subjected to the backlashing, compared to a spinning reel and a spin-casting reel.

Such a problem occurs mainly due to an amount of rotary motion that is performed by the spool.

A variety of brake systems have been proposed in order to solve the problem of backlashing, wherein the brake systems mainly comprise a magnet brake system or a centrifugal brake system.

As compared to the magnet brake system, the centrifugal brake system has an advantage in that as the revolution speed increases, a braking force of the centrifugal brake system increases.

Such a centrifugal brake system was disclosed in Korean unexamined patent publication No. 2002-19401 entitled "Brake system for bait casting reel having unlimited control function".

The above centrifugal brake system for a fishing reel includes a support structure for supporting a truncated conical braking surface, a rotatable spool for fishing line, a plurality of braking elements which rotates together with the spool and is actuated to contact the braking surface, at least one rotatable cam having at least one inclined portion with an outer end and a base end, at least one interacting member which protrudes from the support structure to interact with the cam, and at least one pressing member which continuously forces the interacting member to come into contact with the cam. In use, when the interacting member is brought into contact with the base end, the braking surface is located at a first position, when the interacting member is brought into contact with the outer end, the braking surface is located at a second position, and as the braking surface is moved between the first position and the second position, the braking elements is located such that it is continuously surrounded by the braking surface.

In the conventional fishing reel having the brake system, the plurality of brake elements is formed outside an assembly of the brake elements, so that the respective brake elements come into contact with the braking surface which is outwards from the inside of a brake ring, thereby braking the rotary force of the spool.

However, the conventional fishing reel having the brake system had a problem in that since the brake elements are brought into contact with only the outer surface of the brake ring, upon casting the fishing line, as a sinker or a fish-hook passes through the peak of a casting path, the speed at which the sinker advances while drawing the fish-hook gradually decreases, so that the centrifugal force of the assembly of the brake elements considerably reduces so as not to restrict the revolution of the spool, thereby causing the fishing line to become entangled because the revolution speed of the spool exceeds the unwinding speed of the fishing line.

Here, while a user should control the revolution of the spool with his/her thumb in order to prevent the entanglement of the fishing line, this is a very skillful operation to a beginner.

SUMMARY OF THE INVENTION

Accordingly, the present invention has been made keeping in mind the above problems occurring in the related art, and the present invention is intended to propose a fishing reel having an externally controllable brake system capable of simply controlling a rotary force of a spool by adjusting a brake dial at the outside of the fishing reel, thereby improving the convenience of use.

Further, the present invention is intended to propose a fishing reel having an externally controllable brake system capable of easily controlling a braking force acting on a spool according to an adjustment interval of a brake dial, thereby improving the performance and efficiency of a product.

Furthermore, the present invention is intended to propose a fishing reel having an externally controllable brake system capable of easily controlling a braking force acting on a spool according to simple sliding action by an inclined angle of the inside of a spool cover, thereby simplifying the structure and maximizing the braking efficiency.

In order to achieve the above objects, the present invention provides a fishing reel having an externally controllable brake system including a brake dial provided on a left side cover outside a spool cover, the brake system being provided between the brake dial and the spool cover so as to externally control a rotary force of a spool, the brake system including a rotary section rotating together with a rotary motion of the brake dial, and a brake housing provided close to the rotary section so as to laterally slide in response of the rotation of the rotary section, wherein an inner ring is fixed to the brake housing on an inner surface of the spool cover so as to stop the rotary motion of the spool while being guided along the brake housing.

As set forth before, according to the present invention, the externally controllable brake system of the fishing reel is provided between the spool cover and the left side cover such that it laterally slides as the brake dial rotates, and the inner ring is fixed to the brake housing of the brake system such that it comes into close contact with the spool while being guided along the brake system so as to restrict the rotary motion of the spool, so that a user can control a rotary force of the spool by the simple adjustment at the outside of the fishing reel, and since entanglement of fishing line can be prevented, a beginner as well as a fishing professional can easily use the fishing reel, thereby maximizing the convenience of use as well as efficiency of a product while providing reliability to the user.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
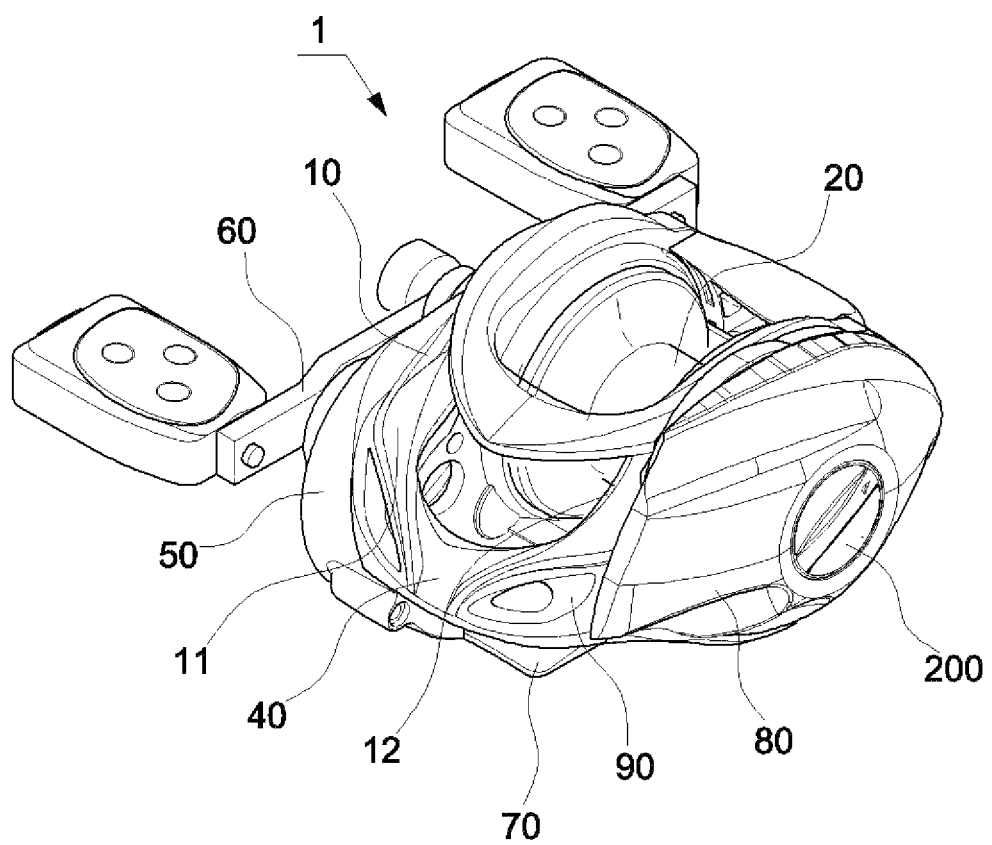
FIG. 1 is a perspective view showing a fishing reel according to the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
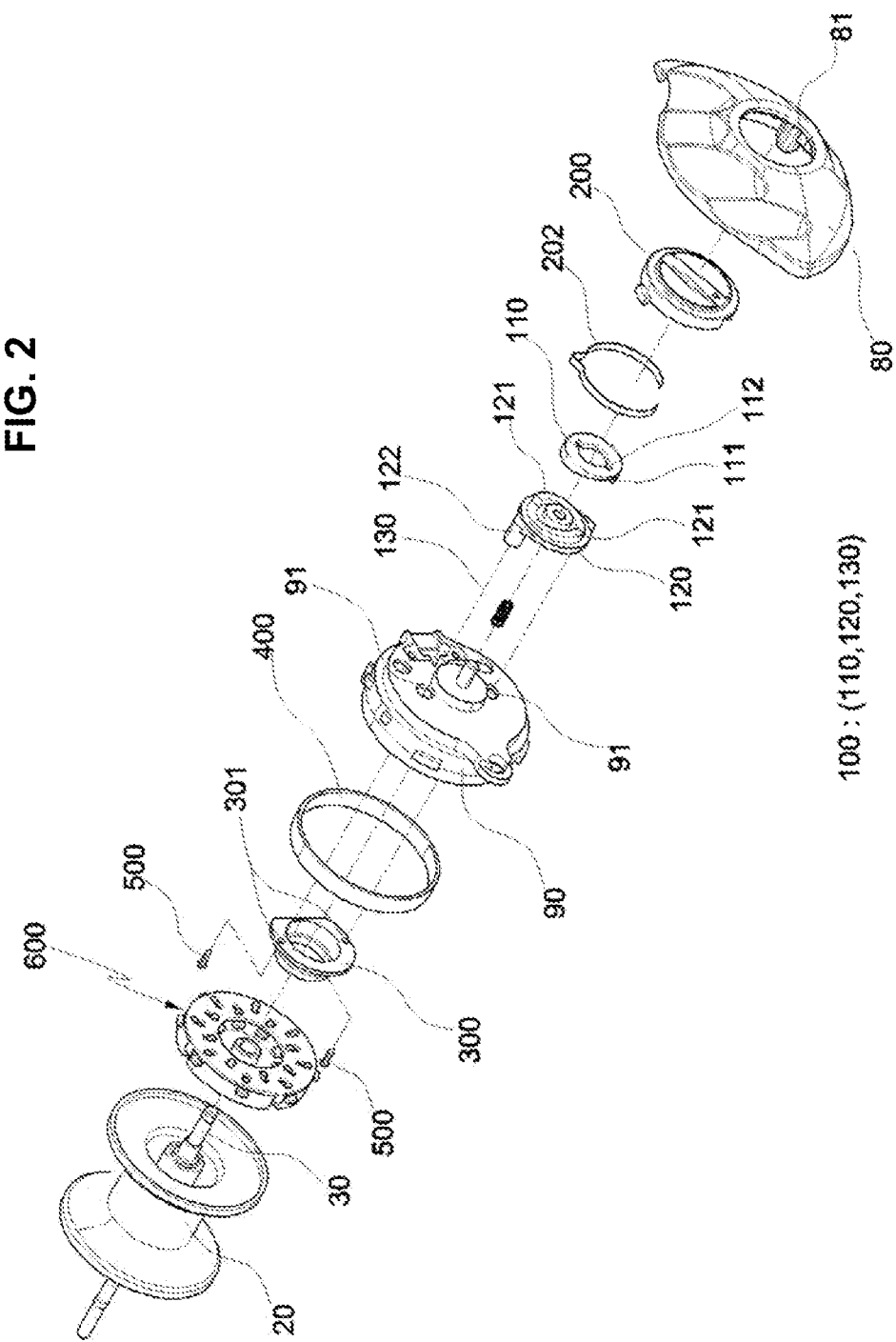
FIG. 2 is an exploded perspective view showing the fishing reel including a spool, an externally controllable brake system, and a spool cover.
Figure 3:
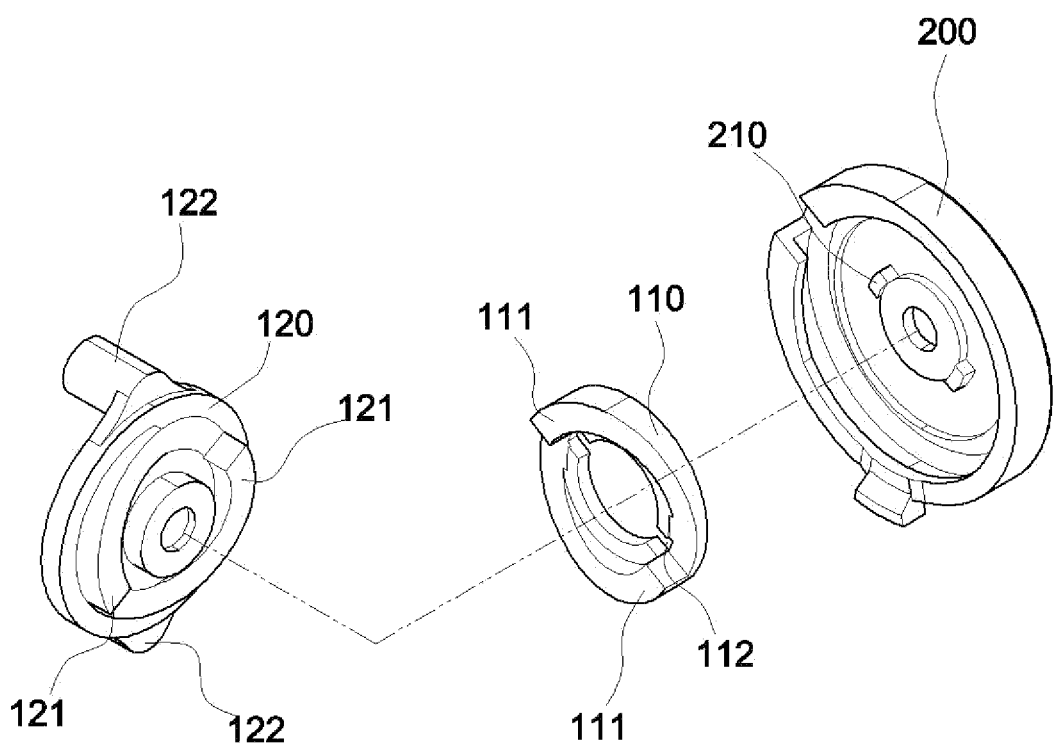
FIG. 3 is an exploded perspective view showing the externally controllable brake system.
Figure 4A:
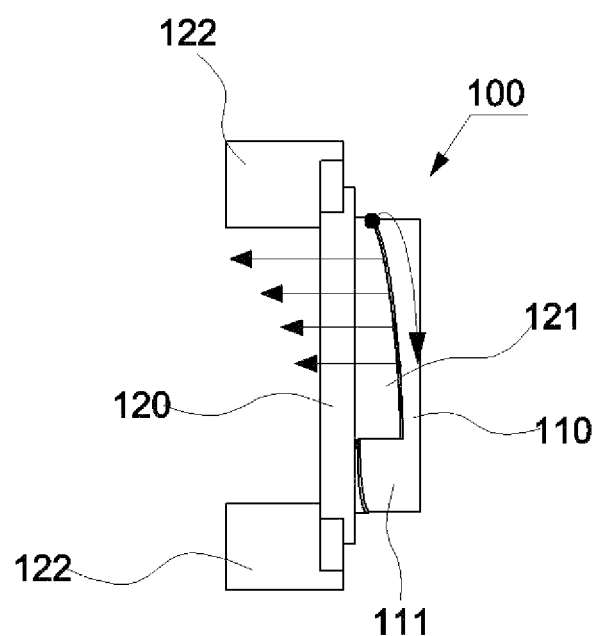
FIG. 4A is a side view of the externally controllable brake system in the state when the spool rotates.
Figure 4B:
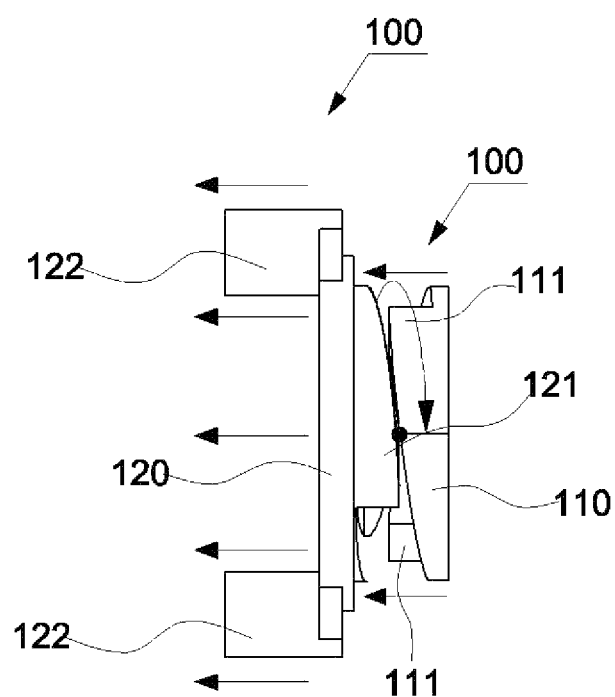
FIG. 4B is a side view of the externally controllable brake system in the state when the spool stops rotating.
Figure 5:
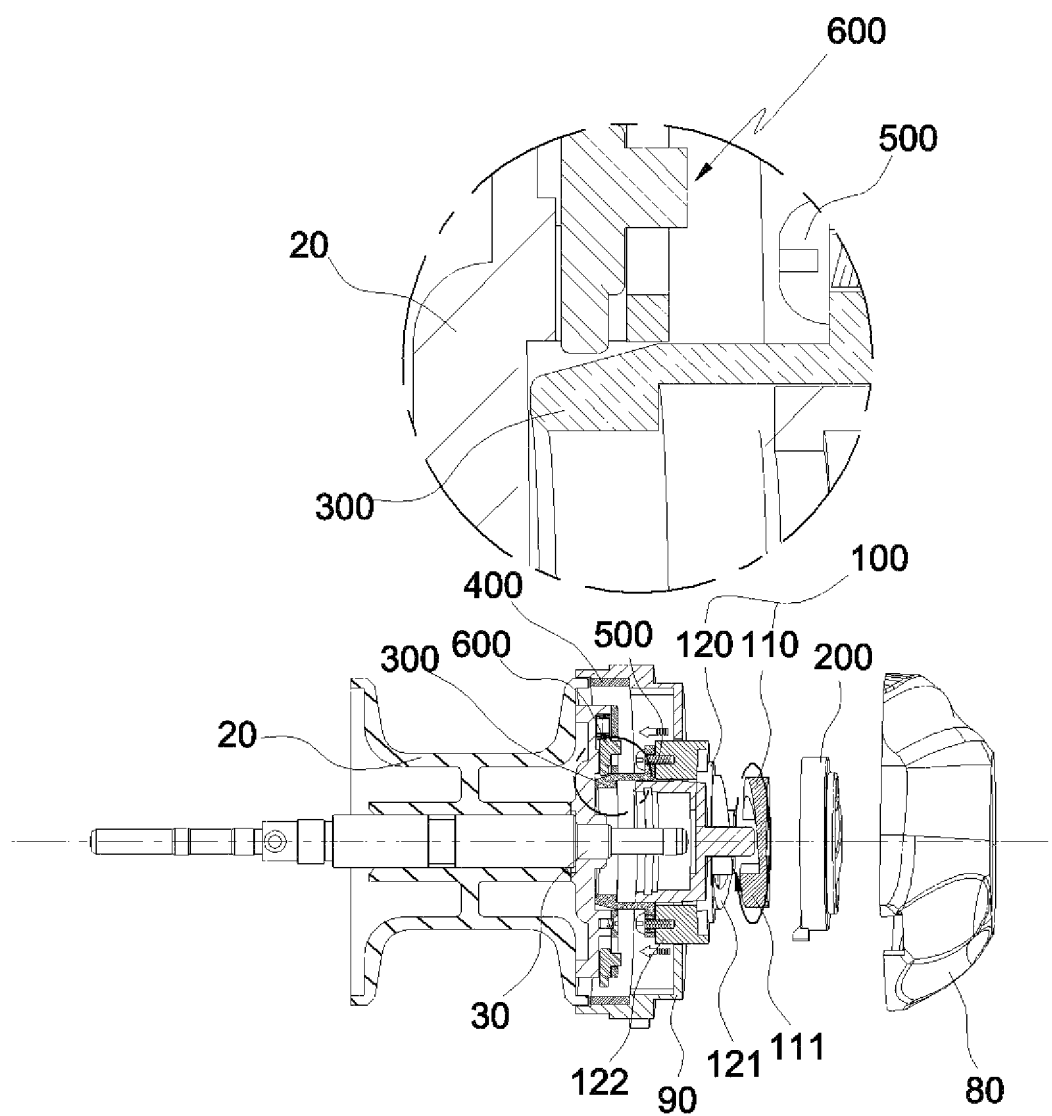
FIG. 5 is a cross-sectional view of the fishing reel in the state when the spool rotates.
Figure 6:
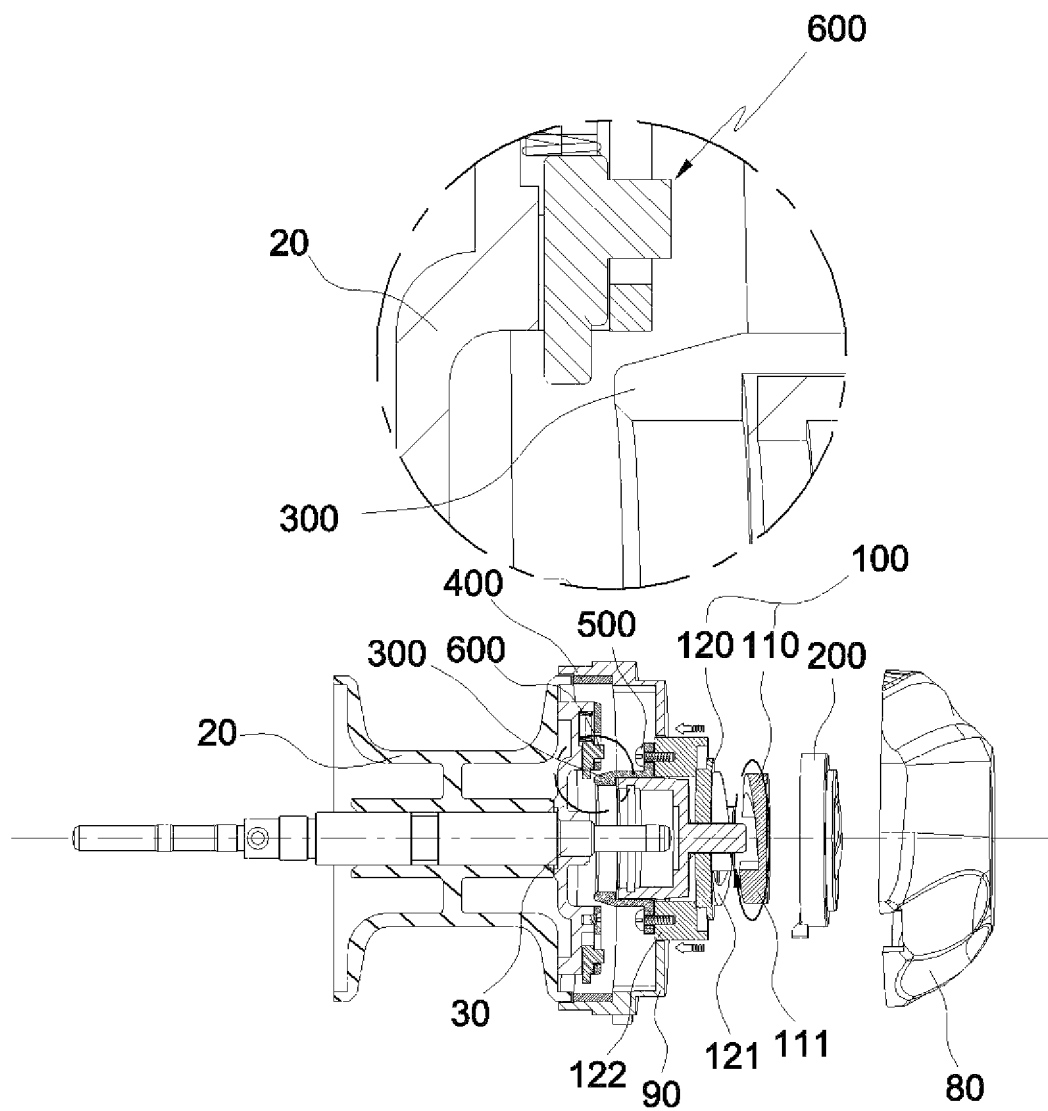
FIG. 6 is a cross-sectional view showing the operation of the externally controllable brake system in the state when the spool stops rotating.

FIG. 1 is a perspective view showing a fishing reel according to the present invention, FIG. 2 is an exploded perspective view showing the fishing reel including a spool, an externally controllable brake system, and a spool cover, FIG. 3 is an exploded perspective view showing the externally controllable brake system, FIG. 4A is a side view of the externally controllable brake system in the state when the spool rotates, FIG. 4B is a side view of the externally controllable brake system in the state when the spool stops rotating, FIG. 5 is a cross-sectional view of the fishing reel in the state when the spool rotates, and FIG. 6 is a cross-sectional view showing the operation of the externally controllable brake system in the state when the spool stops rotating.

As shown in FIGS. 1 to 6, the fishing reel according to the present invention includes a frame 10 having a right plate 11 and a left plate 12, a spool 20 rotatably mounted between the left plate 12 and the right plate 11 of the frame 10 and around which fishing line is wound, a main shaft 30 passing through the spool 20, a level wind mechanism 40 which moves across the spool 20 during winding of fishing line in order to uniformly wind the fishing line over the whole width of the spool 20, a right side cover 50 fixed to the outside of the right plate 11, a handle 60 which operatively extends from the right side cover 50 in order to rotate the spool 20, a reel foot 70 which is formed on the bottom of the frame 10 so as to attach the reel 1 to a fishing rod, and a left side cover 80 fixed onto the left plate 12.

A brake dial 200 is provided at the center of the left side cover 80, and the externally controllable brake system 100 is provided between the brake dial 200 and the spool cover 90 such that it is operated as the brake dial 200 rotates.

An inner ring 300 is provided on an inner surface of the spool cover 90 such that it comes into close contact with the spool 20 in response to the operation of the externally controllable brake system 100 so as to stop a rotary force of the spool 20.

A spring stopper 81 is provided on an inner wall of the left side cover 80.

On an inner surface of the brake dial 200, a dial adjusting spring 202 is coupled such that it engages with the spring stopper 81 of the left side cover 80 so as to provide a rotary interval of the brake dial 200.

In addition, the brake dial 200 has, on an inner surface thereof, coupling pieces 210 which can be coupled with a rotary section 110 of the brake system 100 which will be described below.

The brake system 100 includes the rotary section 110 which rotates as the brake dial 200 rotates, and a brake housing which is brought into close contact with the rotary section 110 so as to laterally slide in response to the rotation of the rotary section 110, thereby guiding the inner ring 300.

The rotary section 110 is provided in one side with opposite slide parts 111 that respectively have an inclined surface, and in the center portion thereof with opposite coupling grooves 112 into which the coupling pieces 210 of the brake dial 200 are fastened so that the rotary section 110 is fixed to the brake dial 200.

The slide part 111 has the inclined surface that extends from one end to the other end at a certain inclined angle, and the opposite slide parts are provided at opposite sides such that the respective inclined surfaces extend in opposite direction.

The brake housing 120 has, in one side, opposite inclined protrusions 121 that respectively have an inclined surface, and in the other side, guide protrusions 122 around which the inner ring 300 is coupled when the guide protrusions pass through through-holes 91 of the spool cover 90 so that the inner ring is guided by the guide protrusion.

The inclined protrusion 121 has the inclined surface that extends from one end to the other end at a certain inclined angle, and the opposite inclined protrusions 121 are provided at opposite sides such that the respective inclined surfaces extend in opposite direction.

The slide parts 111 of the rotary section 110 and the inclined protrusions 121 of the brake housing 120 may preferably be formed such that the respective inclined surfaces are alternately provided so that the brake housing is guided in the left and right sides when the rotary section 110 rotates.

A coil spring 130 is provided between the brake housing 120 and the spool cover 90 so as to elastically support the brake housing 120.

The inner ring 300 is provided with coupling holes 301 to which the guide protrusions 122 of the brake housing 120 are coupled and fastened by screws 500.

The fishing reel 1 is configured to include a brake assembly 600 between the spool cover 90 and the spool 20 so as to externally and internally stop the rotation of the spool 20.

Unexplained reference numeral 400 denotes an outer ring which is coupled onto the inner wall of the spool cover 90 so as to actuate the brake assembly 600.

The operation of the fishing reel having the above-mentioned construction will now be described.

First, after the fishing reel 1 has been mounted to a fishing rod, when the fishing line is cast, the spool 20 rotates in the cast direction while the fishing line is being unwounded from the spool 20.

Then, after the fishing line has been unwounded by the rotation of the spool 20, when the rotary motion of the spool 20 is intended to stop, a user turns the brake dial 200 provided on the left side cover at the outside of the reel, so that the brake system 100, which is coupled to the brake dial 200, also rotates.

In this way, as the brake dial 200 rotates, the rotary section 110 coupled with the brake dial 200 also rotates so that at the same time, the opposite slide parts 111 of the rotary section 110, which have the opposite inclined surfaces extending towards opposite direction, rotate along the inclined protrusions 121 of the brake housing 120, which have the inclined surfaces that alternately extend.

Since the inclined surfaces of the slide parts 111 and inclined protrusions 121 are alternately formed such that the inclined heights oppositely alternate, the slide parts 111 slide towards higher side of the inclined surfaces of the inclined protrusions 121, so that the brake housing engaging with the rotary section 110 is guided towards one side while being separated away from the rotary section 110, and thus the inner ring 300 coupled with the brake housing 120 is also guided in the same direction as the brake housing 120 and comes into close contact with the spool 20, thereby stopping the rotation of the spool 20.

On the contrary, when the brake dial 200 is turned in the opposite direction, the rotary section 110 reversely rotates, the slide parts 111 of the rotary section 110, which was separated away from the brake housing 120, rotate towards the lower side of the inclined surfaces of the inclined protrusions 121, and at the same time, the brake housing 120 is guided towards the other side by the elastic force of the coil spring 130, so that the inner ring 300 coupled with the brake housing 120 is also guided towards the other side and is separated away from the spool 20, so that the spool 20 can maintain its rotation state.

Further, when the externally controllable brake system 100 is operated by turning the brake dial 200, the dial adjusting spring 202 engages with and goes beyond the spring stopper 81, so that the braking state of the brake system 100 can be checked.

Thus, according to the fishing reel 1 of the present invention, the rotation of the spool 20 can be stopped by externally adjusting the brake dial 200 to cause the rotation and slide of the externally controllable brake system 100, thereby providing convenience of use and maximizing the braking efficiency.

Although the exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A fishing reel comprising: a frame having a right plate and a left plate; a spool rotatably mounted between the left plate and the right plate of the frame and around which fishing line is wound; a main shaft passing through the spool; a level wind mechanism which moves across the spool during winding of fishing line in order to uniformly wind the fishing line over the whole width of the spool; a right side cover fixed to an outside of the right plate; a handle which operatively extends from the right side cover in order to rotate the spool; a reel foot which is formed on a bottom of the frame so as to attach the fishing reel to a fishing rod; a left side cover fixed onto the left plate; a brake dial provided at a center of the left side cover and having coupling pieces on an inner surface thereof; an externally controllable brake system provided between the brake dial and a spool cover so as to be actuated in response to the rotation of the brake dial; and an inner ring provided on an inner surface of the spool cover such that it comes into close contact with the spool in response to the operation of the externally controllable brake system so as to stop a rotary force of the spool, said brake system including a rotary section coupled with the coupling pieces of the brake dial such that the rotary section rotates as the brake dial rotates, and a brake housing which is brought into close contact with the rotary section and passes through the spool cover so as to laterally slide in response to the rotation of the rotary section, thereby guiding the inner ring.

2. The fishing reel according to claim 1, wherein the rotary section is provided in one side with opposite slide parts that respectively have an inclined surface, and in a center portion thereof with opposite coupling grooves into which the coupling pieces of the brake dial are fastened so that the rotary section is fixed to the brake dial, wherein the slide part has an inclined surface that extends from one end to the other end at a certain inclined angle, and the opposite slide parts are provided at opposite sides such that the respective inclined surfaces extend in opposite direction.

3. The fishing reel according to claim 1, wherein the brake housing has, in one side, opposite inclined protrusions that respectively have an inclined surface, and in the other side, guide protrusions around which the inner ring is coupled when the guide protrusions pass through through-holes of the spool cover so that the inner ring is guided by the guide protrusion, wherein the inclined protrusion has the inclined surface that extends from one end to the other end at a certain inclined angle, and the opposite inclined protrusions are provided at opposite sides such that the respective inclined surfaces extend in opposite direction.

4. The fishing reel according to claim 2 or 3, wherein slide parts of the rotary section and the inclined protrusions of the brake housing are formed such that the respective inclined surfaces are alternately provided so that the brake housing is guided in the left and right sides when the rotary section rotates.

5. The fishing reel according to claim 1, wherein a spring stopper is provided on an inner wall of the left side cover, and wherein on the inner surface of the brake dial, a dial adjusting spring is coupled such that the dial adjusting spring engages with the spring stopper of the left side cover so as to provide a rotary interval of the brake dial.

6. The fishing reel according to claim 1, wherein a coil spring is provided between the brake housing and the spool cover so as to elastically support the brake housing.

7. The fishing reel according to claim 1, wherein a brake assembly is provided between the spool cover and the spool so as to externally and internally stop the rotation of the spool.

\* \* \* \* \*